US008186223B2

(12) United States Patent  
Dawson et al.

(10) Patent No.: US 8,186,223 B2  
(45) Date of Patent: May 29, 2012

(54) STRUCTURAL INTEGRITY MONITORING SYSTEM

(75) Inventors: Richard Nils Dawson, Voorheesville, NY (US); Gary Randall Barnes, Delanson, NY (US); Peter Anthony DiLorenzo, Charlton, NY (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 12/429,239

(22) Filed: Apr. 24, 2009

(65) Prior Publication Data

US 2010/0269592 A1 Oct. 28, 2010

(51) Int. Cl.  
*G01D 7/00* (2006.01)
(52) U.S. Cl. ........................................... 73/587
(58) Field of Classification Search .............. 73/587–588  
See application file for complete search history.

(56) References Cited

U.S. PATENT DOCUMENTS

| 4,901,575 | A |  | 2/1990 | Bohannan et al. |
| 5,195,046 | A | * | 3/1993 | Gerardi et al. ................. 702/35 |
| 5,520,052 | A | * | 5/1996 | Pechersky ....................... 73/579 |
| 5,621,174 | A | * | 4/1997 | Amanuma et al. .............. 73/661 |
| 6,584,849 | B2 | * | 7/2003 | Loftus et al. .................... 73/659 |
| 6,747,268 | B1 | * | 6/2004 | Ume ........................ 250/227.11 |
| 6,779,404 | B1 |  | 8/2004 | Brincker et al. |
| 6,980,910 | B1 | * | 12/2005 | Shen et al. ...................... 702/56 |
| 7,546,224 | B2 | * | 6/2009 | Campbell ......................... 703/1 |
| 2005/0016269 | A1 |  | 1/2005 | Touzov |
| 2005/0061076 | A1 | * | 3/2005 | Kim ............................... 73/587 |
| 2007/0261492 | A1 |  | 11/2007 | Board |

OTHER PUBLICATIONS

Extended European Search Report for corresponding EP Application No. 10160633.3-1236, dated Sep. 9, 2011, pp. 1-5.

* cited by examiner

*Primary Examiner* — Max Noori  
(74) *Attorney, Agent, or Firm* — Cantor Colburn LLP

(57) ABSTRACT

A structural integrity monitoring system includes a structure, at least two vibration monitoring devices mounted to the structure. Each of the at least two vibration monitoring devices outputs a vibration response signal. The structural integrity monitoring system also includes a controller operatively connected to each of the at least two vibration monitoring devices. The controller is configured to calculate a predicted vibration response based upon a vibration mode shape and the vibration response signal. The controller then compares the predicted vibration response against a measured vibration response to detect changes in the structure.

16 Claims, 4 Drawing Sheets

STRUCTURAL INTEGRITY MONITORING SYSTEM

BACKGROUND OF THE INVENTION

The subject matter disclosed herein relates to the art of monitoring systems and, more particularly, to a structural integrity monitoring system.

Removing a piece of equipment, such as a turbomachine, generator, or the like, from service in order to perform routine inspections, or to conduct vibration testing to assess structural integrity, is very costly. The costs accrue not only in terms of lost revenue and actual disassembly, but the inspections and tests are themselves costly. However, failure to perform the inspections, and particularly the tests, could lead to significant and hence even more expensive failures. That is, in general, turbomachines, generators, and the like, are subjected to strenuous loads, harsh operating environments and conditions that, over time, lead to deterioration of certain components. Failure to detect this deterioration can result in machine failure. Significant failures of the machine would far outweigh the costs associated with inspection and testing.

One method employed to detect deterioration is to test structural integrity of system components. Online vibration monitoring is commonly used to detect structural integrity defects. However, when using online vibration monitoring, it is sometimes difficult to determine if changes in vibration (increasing or decreasing) are the result of changing loads on the structure, expected changes in structure, or the result of deterioration of the structure. Other types of structural integrity tests include modal vibration testing.

Modal vibration testing of structures typically requires that the structure to be tested be removed from service. In one such testing technique, actuation devices are permanently mounted to the structure. The actuation devices are operated to mechanically excite the structure. Once excited, vibration measurements are taken and compared against baseline measurements to check the integrity of the structure. Still other forms of vibration testing include setting vibration alarm levels and shut down levels. However, such systems cannot distinguish between vibrations that occur as a result in changes in loads from vibrations that occur as a result of changes in the structure.

BRIEF DESCRIPTION OF THE INVENTION

According to one aspect of the invention, a structural integrity monitoring system includes a structure, at least two vibration monitoring devices mounted to the structure. Each of the at least two vibration monitoring devices outputs a vibration response signal. The structural integrity monitoring system also includes a controller operatively connected to each of the at least two vibration monitoring devices. The controller is configured to calculate a predicted vibration response based upon a vibration mode shape and the vibration response signal. The controller then compares the predicted vibration response against a measured vibration response to detect changes in the structure.

According to another aspect of the invention, a method of determining structural integrity of a structure includes measuring at least one mode shape from the structure, collecting vibration data from at least two vibration sensors mounted to the structure, calculating a predicted vibration response of the structure based on the at least one measured mode shape and the collected vibration data, comparing the predicted vibration response to a measured vibration response of the structure to establish a comparison factor, detecting changes in the structure based upon the comparison factor to determine integrity of the structure, and graphically illustrating the integrity of the structure on a display.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
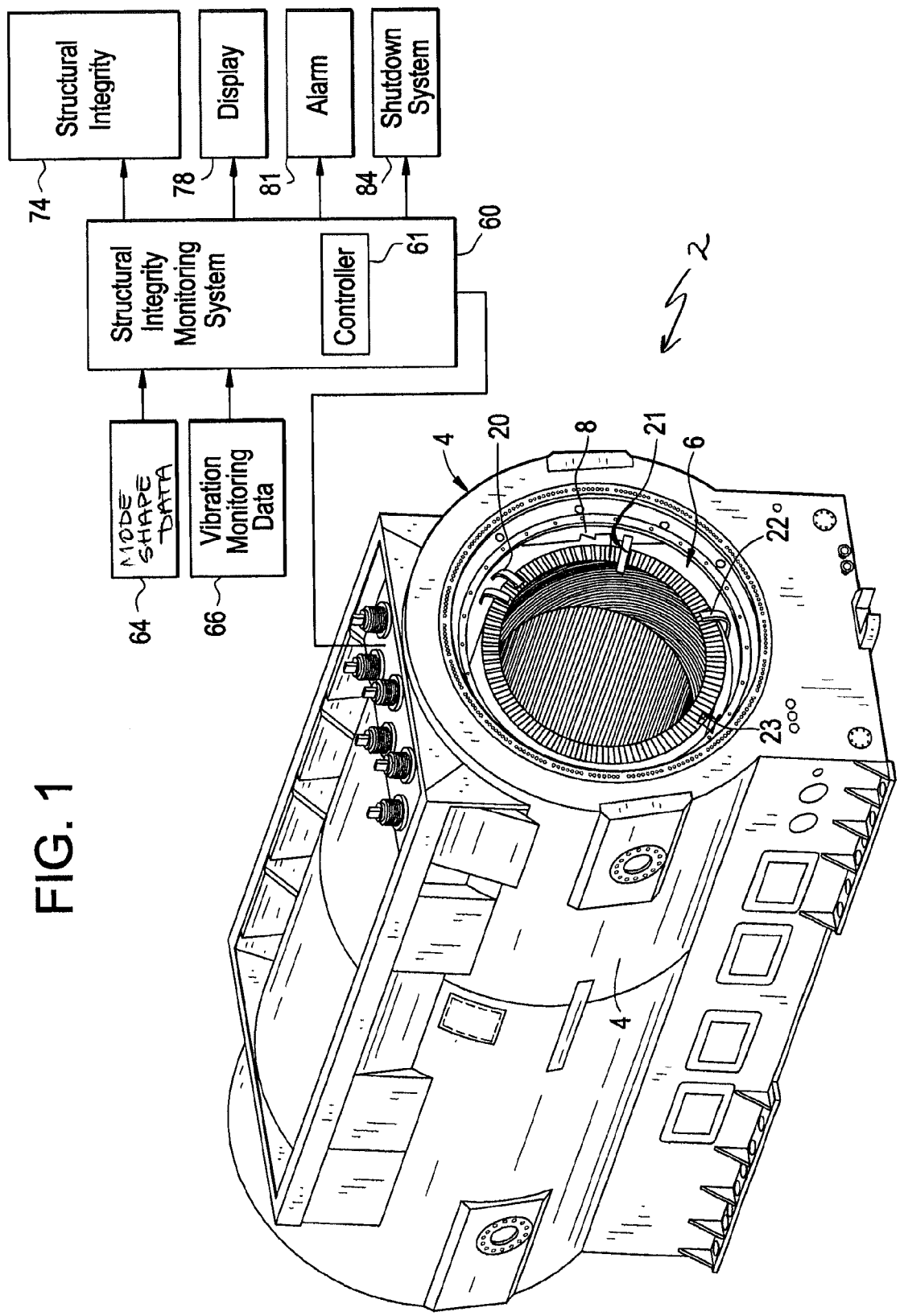
FIG. 1 is an upper right perspective view of a generator including a structural integrity monitoring system in accordance with an exemplary embodiment.
Figure 2:
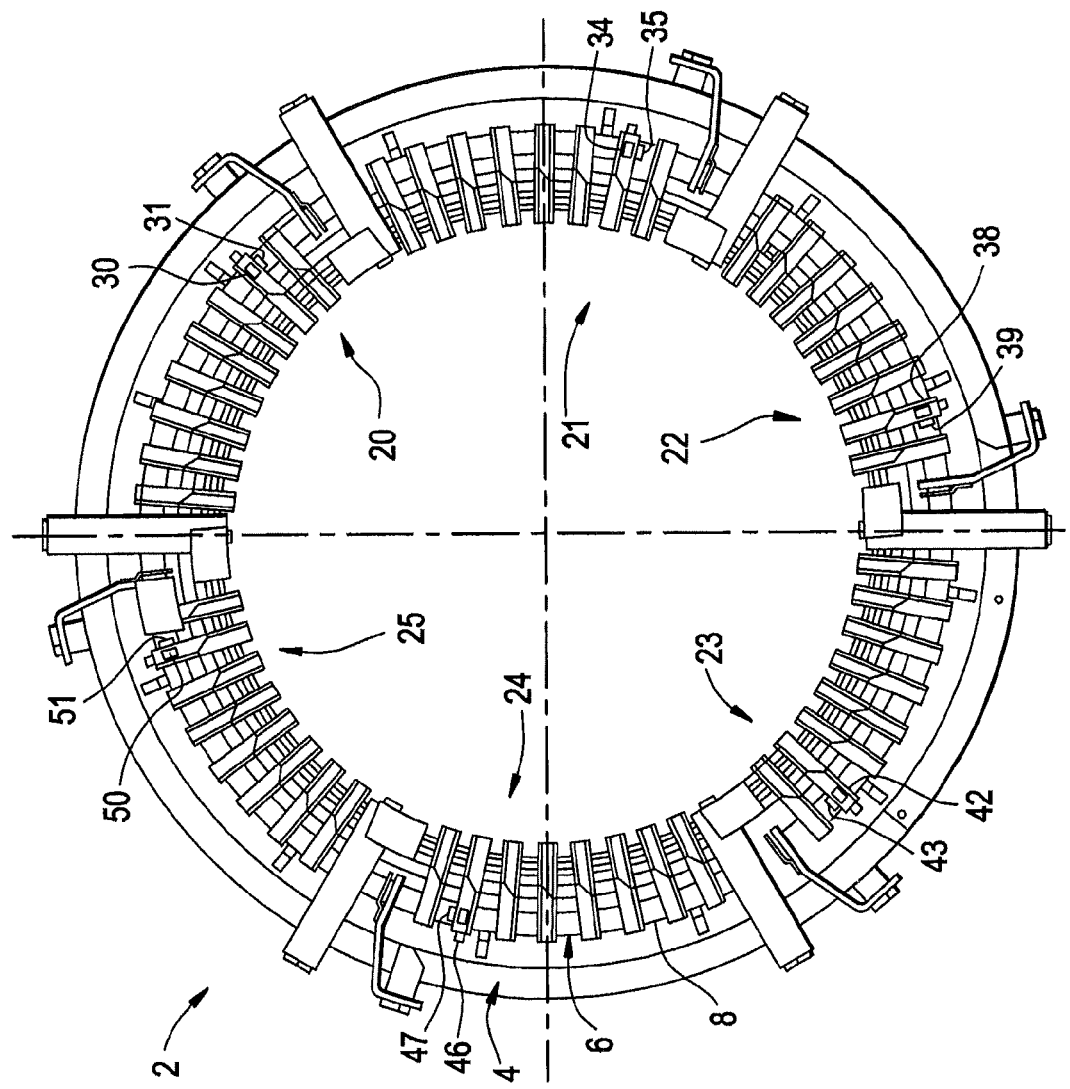
FIG. 2 is front elevational view of the generator of FIG. 1.

With reference to FIGS. 1-2, a structure, shown in the form of a generator, is indicated generally at 2. Of course, it should be understood that the structure can take on a variety of forms. Generator 2 includes a housing 4 having arranged therein a stator 6 having an end winding 8 and a rotor (not shown). Stator 6 includes a plurality of vibration monitoring devices 20-25 mounted to end winding 8 for detecting vibrations that occur during operation of generator 2. Additional vibration monitoring devices (not shown) are mounted to portions of stator 6 as well as other areas of generator 2.

Each vibration monitoring device 20-25 includes at least one vibration sensor. In the exemplary embodiment shown, vibration monitoring device 20 includes a first or radial vibration sensor 30 and a second or axial vibration sensor 31. Similarly, vibration monitoring device 21 includes a radial vibration sensor 34 and an axial vibration sensor 35, vibration monitoring device 22 includes a radial vibration sensor 38 and an axial vibration sensor 39, vibration monitoring device 23 includes a radial vibration sensor 42 and an axial vibration sensor 43, vibration monitoring device 24 includes a radial vibration sensor 46 and an axial vibration sensor 47, and vibration monitoring device 25 includes a radial vibration sensor 50 and an axial vibration sensor 51. Vibration monitoring devices 20-25 can take the form of displacement sensors, accelerometers, strain gauges, velocity sensors, and the like.

In accordance with the exemplary embodiment shown, generator 2 includes a structural integrity monitoring system 60 that monitors, in real time, the structural integrity of stator 6. Of course it should be understood that structural integrity monitoring system 60 could be employed to monitor other areas, components of generator 2. Structural integrity monitoring system 60 includes a controller 61 operationally linked to each of the plurality of vibration monitoring devices 20-25. As will be discussed more fully below, controller 61 received baseline modal shape data 64 and real time vibration monitoring data 66. Controller 61 employs modal shape data 64 and real time vibration monitoring data 66 to determine a structural integrity indicator 74 of stator 6 at end winding 8. Structural integrity indicator 74 is selectively output to a display 78 operatively connected to structural integrity monitoring system 60. Based upon structural integrity indicator 74, structural integrity monitoring system 60 activates an alarm 81 and/or a shutdown system 84.

Figure 3:
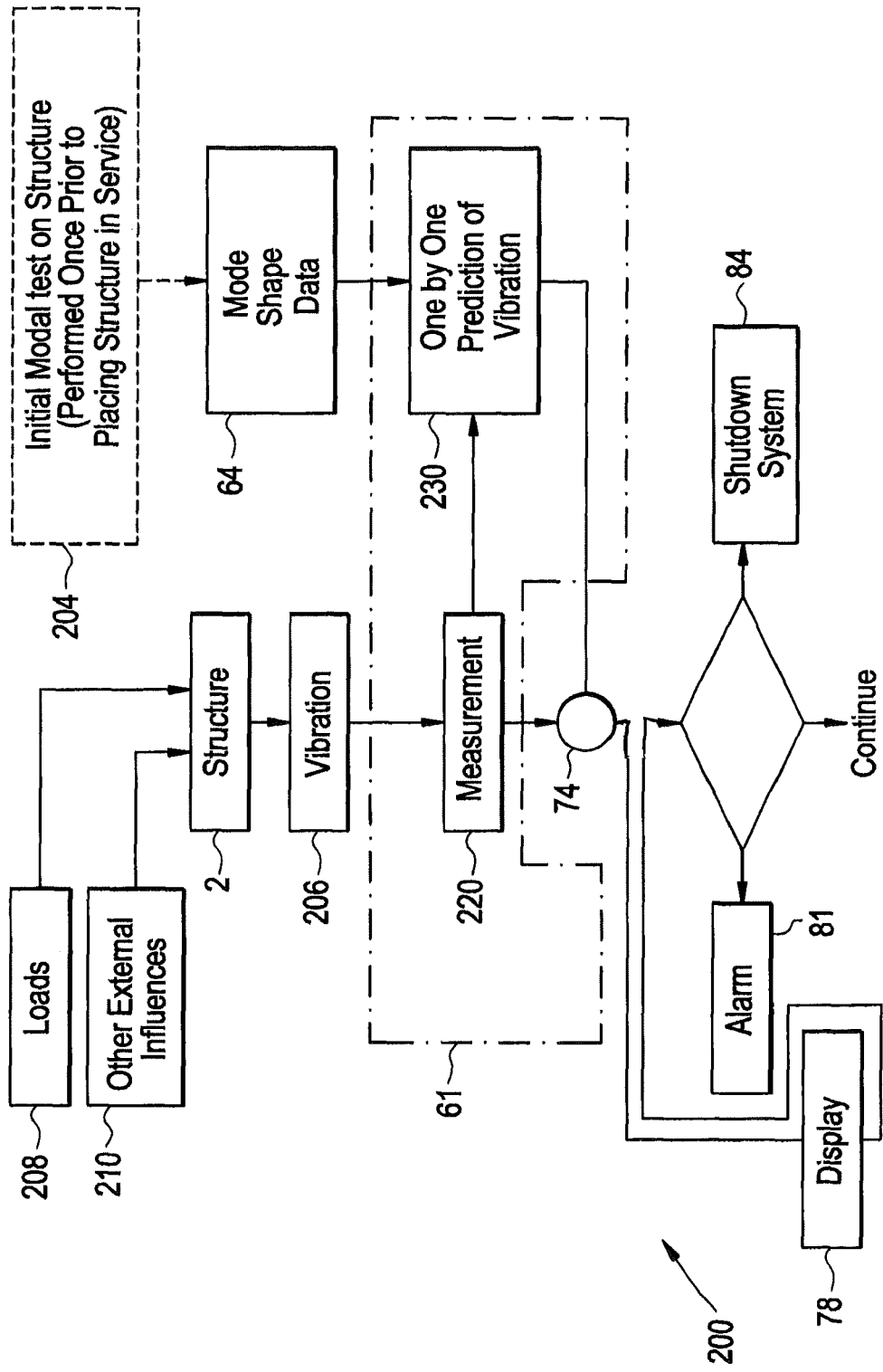
FIG. 3 is a flow diagram illustrating a method of monitoring structural integrity in accordance with an exemplary embodiment.

Reference will now be made to FIG. 3 in describing a method 200 employed by structural integrity monitoring system 60 to determine structural integrity of stator 6. Initially, baseline modal shape data 64 is determined for stator 6 as indicated in block 204. More specifically, a modal analysis test is performed on stator 6. The modal analysis test includes exciting the stator 6 and measuring the vibration response signals at vibration monitoring devices 20-25. Stator 6 is impacted with an instrumented hammer or an electromagnetic or hydraulic shaker that serve as a known excitation input signal. Both the known excitation input signal (force from hammer or shaker) and vibration response signal measured at vibrations monitoring device 20-25 are measured in the time domain. The signals are transformed into the frequency domain using a Fast Fourier transform (FFT) and divided (response/input) to create a transfer function for each vibrations monitoring device 20-25. Using standard modal analysis methods, natural frequencies and mode shapes are extracted from the transfer function. The natural frequencies and mode shapes are input as mode shape data 64 to structural integrity monitoring system 60.

Once baseline data is obtained in block 204, generator 2 is brought into service and vibration signals are captured, in real time, though vibration monitoring devices 20-25 as indicated in block 206. The vibrations sensed are based on load conditions as indicated in block 208, and other external influences such as forces due to rotor imbalance or vibrations transmitted from other adjacent components, as indicated in block 210. The vibration signals are measured as indicated in block 220 and a one by one prediction is performed on the vibration signals as indicated in block 230. The one-by-one prediction calculates a predicted vibrations level for each of the plurality of vibration monitoring devices 20-25 by eliminating, one-by one, a column of [u] and a row of [v] in the matrix outlined in Equation 1.1. A new set of coefficients [C] are calculated based on the remaining elements in the matrix. The new coefficients [C] are a prediction of the contribution from each mode in matrix [u]. The new set of coefficients [C] is used to predict the vibration level for the particular vibration monitoring device 20-25, i.e., the particular element [v] eliminated. The predicted value is then compared to the corresponding measured modal shape data to vibration level in block 220 to determine a comparison factor. The use of modal shape data to predict vibration level for each element [v] eliminated is valid of any load applied or any excitation from external conditions as long as the mode shapes of the structure have not changed. A significant difference between vibration level at any sensor and measured vibration level at that sensor can only occur if the mode shapes of the structure have changes, indicating a change in the structure has occurred. This method allows for real time, continuous monitoring of structural integrity. By monitoring, in real time, structural integrity, any changes are detected early allowing for a quick response to address any required maintenance issues.

$$\begin{bmatrix} u_{11} & u_{12} & u_{13} & u_{14} & \ldots & u_{1n} \\ u_{21} & u_{22} & u_{23} & u_{24} & \ldots & u_{1n} \\ u_{31} & u_{32} & u_{33} & u_{34} & \ldots & u_{1n} \\ \ldots & \ldots & \ldots & \ldots & \ldots & \ldots \\ u_{m1} & u_{m2} & u_{m3} & u_{m4} & \ldots & u_{mn} \end{bmatrix} \times \begin{bmatrix} C_1 \\ C_2 \\ C_3 \\ C_4 \\ \ldots \\ C_n \end{bmatrix} = \begin{bmatrix} v_1 \\ v_2 \\ v_3 \\ \ldots \\ v_m \end{bmatrix} \quad \text{Equation 1.1}$$

or $$[u] \times [C] = [v]$$

The comparison factor is graphically output to display 78 for evaluation. If the comparison factor indicates that the predicted value does not match the corresponding measured vibration data, then the measured mode shape no longer represents the actual vibration response indicating that stator 6 has undergone a change in structural integrity. Detecting a change in structural integrity, structural integrity monitoring system 60 sends a signal to alarm 81. If the change in structural integrity exceeds a predetermined value structural integrity monitoring system 60 signals shut down system 84 to halt operation of generator 2. The predetermined value that initiates either an alarm or shutdown is based upon the particular structure being monitored, operating conditions, experience, normal changes, and noise in the measured vibration signal.

Figure 4:
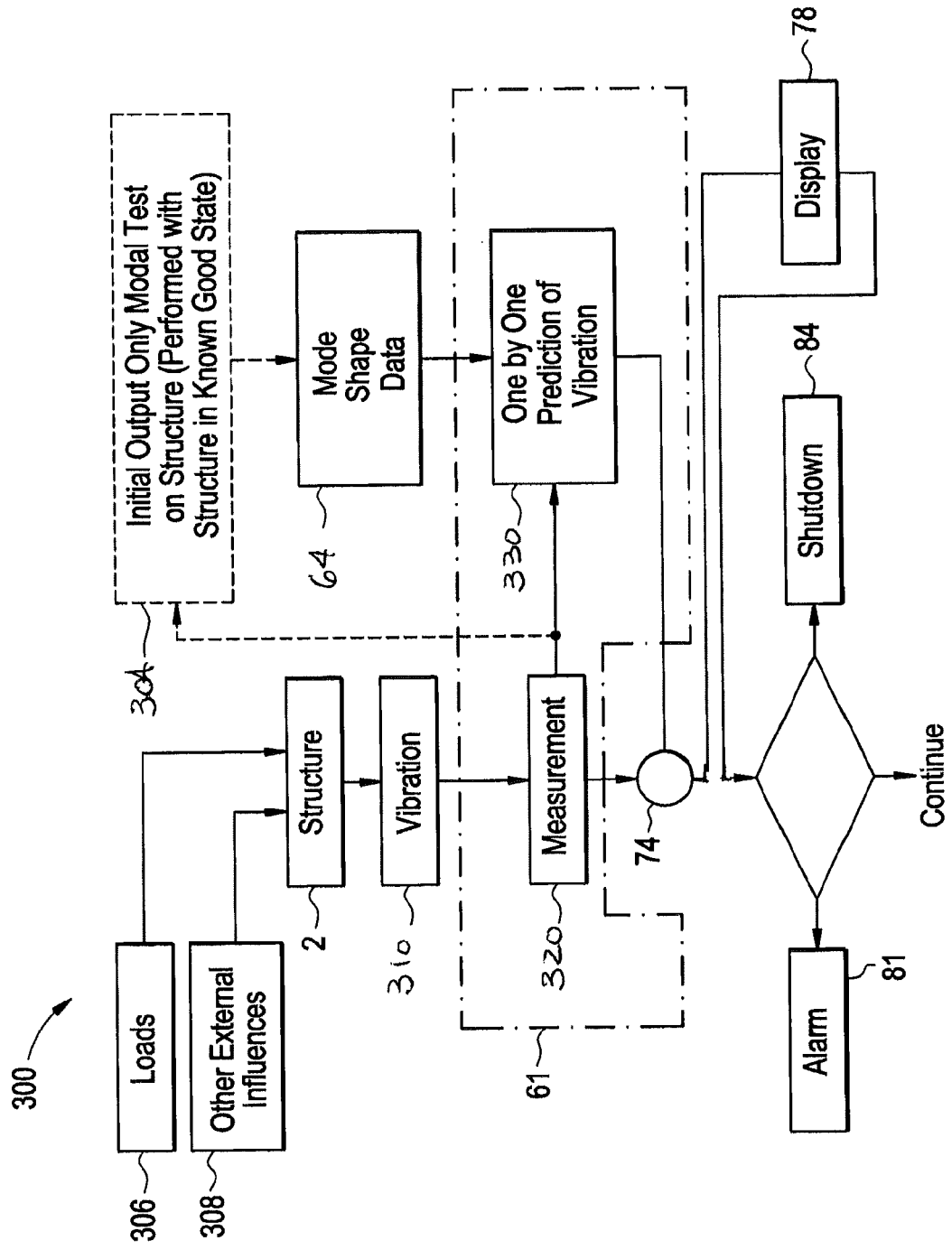
FIG. 4 is a flow diagram illustrating a method of monitoring structural integrity in accordance with another exemplary embodiment The detailed description explains embodiments of the invention, together with advantages and features, by way of example with reference to the drawings.

Reference will now be made to FIG. 4 in describing a describing a method 300 employed by structural integrity monitoring system 60 to determine structural integrity of stator 6 in accordance with another exemplary embodiment. In a manner similar to that described above, initially, baseline modal shape data 64 is determined for stator 6 as indicated in block 304. More specifically, a modal analysis test is performed on stator 6. However, in contrast to the modal analysis test preformed above, the modal analysis test in accordance with the exemplary embodiment utilized the operational vibrations of generator 2. More specifically in place of external excitation forces, generator 2 is started and load forces, as indicated in block 306 and other external influences, as indicated in block 308 are detected by vibration monitoring devices 20-25 as indicated in block 310. Vibration monitoring devices output vibration response signals that are measured in the time domain as indicated in block 320. The signals are transformed into the frequency domain using a Fast Fourier transform (FFT). Using standard output only modal analysis methods, natural frequencies and mode shapes are extracted from the measured vibration levels. The natural frequencies and mode shapes are input as mode shape data 64 to structural integrity monitoring system 60.

Once baseline data is obtained in block 304, generator 2 is brought into service and vibration signals are captured, in real time, though vibration monitoring devices 20-25 as indicated in block 310. In a manner similar to that described above, the vibrations sensed are based on the load conditions as indicated in block 306, and other external influences, as indicated in block 308. The vibration signals are measured as indicated in block 320 and a one by one prediction is performed on the vibration signals as indicated in block 330. In a manner also similar to that described above, the one-by-one prediction calculates a predicted vibration level for each of the plurality of vibration monitoring devices 20-25 by eliminating, one-by one, a column of [u] and a row of [v] in the matrix outlined in Equation 1. A new set of coefficients [C] are calculated based on the remaining elements in the matrix. The new coefficients [C] are a prediction of contribution from each mode in matrix [u]. The new set of coefficients is used to predict the vibration level for the particular vibration monitoring device 20-25, i.e., the particular element [v] eliminated. The predicted value is then compared to the corresponding measured vibration level in block 220 to determine a comparison factor.

The comparison factor is graphically output to display 78 for evaluation. If the comparison factor indicates that the predicated value does not match the corresponding measured vibration level data point, then the measured mode shape no longer represents the actual vibration response indicating that stator 6 has undergone a change in structural integrity. Detecting a change in structural integrity, structural integrity monitoring system 60 sends a signal to alarm 81. If the change in structural integrity exceeds a predetermined value, structural integrity monitoring system 60 signals shut down system 84 to halt operation of generator 2.

At this point it should be understood that the exemplary embodiments provide a system and method that provides real-time structural integrity monitoring of a structure subjected to either steady state dynamic forces or transient dynamic forces. By employing mode shape data as a structural model, external vibrations due to changing load conditions and the like are filtered out allowing structural integrity monitoring system 60 to monitor changes in the structural integrity of a structure during operation creating savings in both operational and maintenance costs. It should also be understood that while shown and described in connection with testing structural integrity of generator components, structural integrity monitoring system 60 can be employed in connection with a wide range of structures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A structural integrity monitoring system comprising:
at least two vibration monitoring devices configured and disposed to be mounted to a structure, each of the at least two vibration monitoring devices outputting a vibration response signal; and
a controller operatively connected to each of the at least two vibration monitoring devices, the controller including baseline modal shape data and being programmed to calculate a predicted vibration response based upon a vibration mode shape from the baseline modal shape data and the vibration response signal, wherein the controller compares the predicted vibration response against a measured vibration response to detect changes in the structure.

2. The structural integrity monitoring system according to claim 1, wherein the at least two vibration monitoring devices include at least one displacement sensor.

3. The structural integrity monitoring system according to claim 1, wherein the at least two vibration monitoring devices include at least one accelerometer.

4. The structural integrity monitoring system according to claim 1, wherein the at least two vibration monitoring devices include at least one strain gauge.

5. The structural integrity monitoring system according to claim 1, wherein the at least two vibration monitoring devices include at least one velocity sensor.

6. The structural integrity monitoring system according to claim 1, wherein the plurality of vibration monitoring devices include at least two of displacement proximity probes, accelerometers, and strain gauges.

7. The structural integrity monitoring system according to claim 1, further comprising: a display operatively linked to the controller, the display presenting, in graphical format, an indication of the structural integrity of the structure.

8. The structural integrity monitoring system according to claim 1, wherein the structure is a generator.

9. A method of determining structural integrity of a structure, the method comprising:
measuring at least one mode shape of the structure;
collecting vibration data from at least two vibration sensors mounted to the structure;
calculating an predicted vibration response of the structure based on the at least one measured mode shape and the collected vibration data;
comparing the predicted vibration response to a measured vibration response of the structure to establish a comparison factor;
detecting changes in the structure based upon the comparison factor to determine integrity of the structure; and
graphically illustrating the integrity of the structure on a display.

10. The method of claim 9, wherein, collecting vibration data from at least one vibration sensor comprises collecting vibration data from a plurality of vibration sensors mounted to the structure.

11. The method of claim 9, wherein, calculating a predicted vibration response of the structure based on the at least one measured mode shape and the collected vibration data comprises determining a mode shape matrix and a vibration matrix.

12. The method of claim 11, further comprising: calculating a coefficient matrix based on the mode shape matrix and the vibration matrix, wherein the coefficient matrix describes the predicted vibration response.

13. The method of claim 9, further comprising: indicating that the integrity of the structure has changed whenever the comparison factor indicates that the predicted vibration response does not match the measured vibration response.

14. The method of claim 9, further comprising: indicating that the integrity of the structure has changed whenever the comparison factor indicates that the predicted vibration response matches the measured vibration response.

15. The method of claim 9, wherein measuring at least one mode shape of the structure includes measuring the mode shape of a structure subjected to at least one of a steady state dynamic force and a transient dynamic force.

16. The method of claim 15, wherein measuring the mode shape of a structure subjected to the at least one of a steady state dynamic force and a transient dynamic force includes measuring the mode shape of a generator.

* * * * *